Sept. 20, 1971   M. BROEKMAN   3,605,304
FILM STRIP EQUIPMENT
Filed April 3, 1968   2 Sheets-Sheet 1
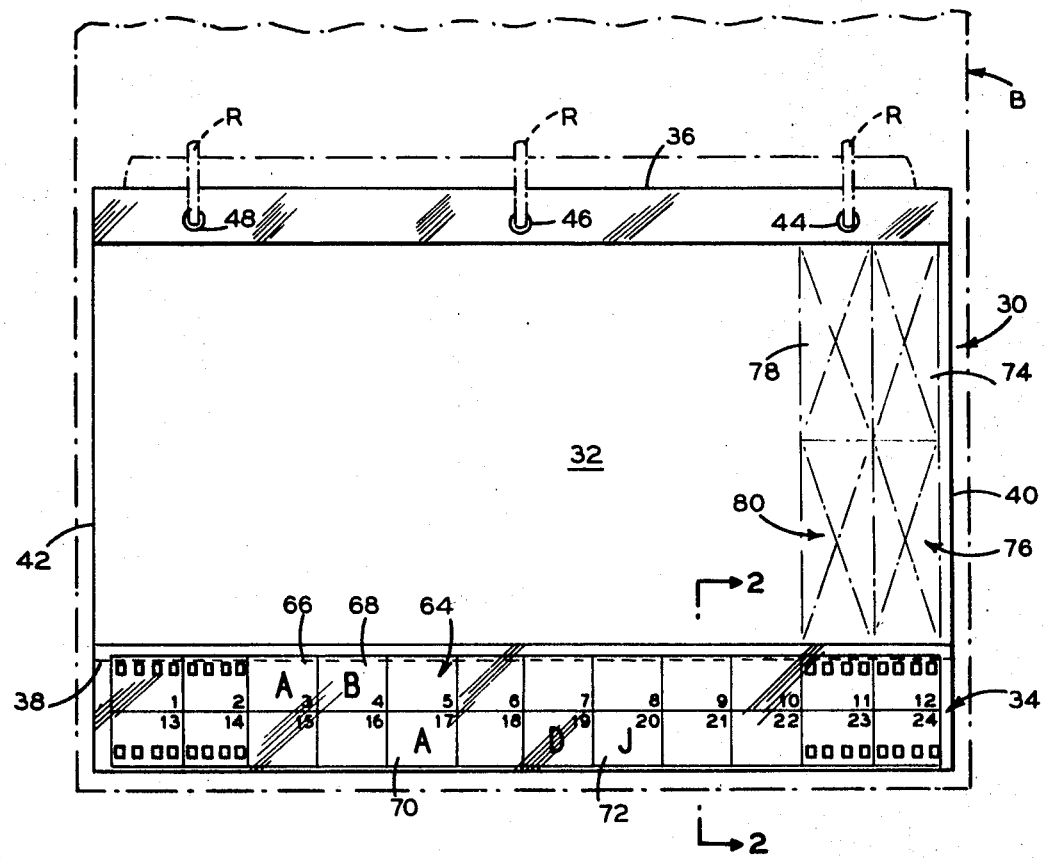
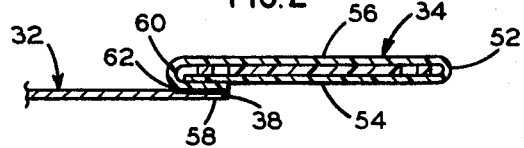
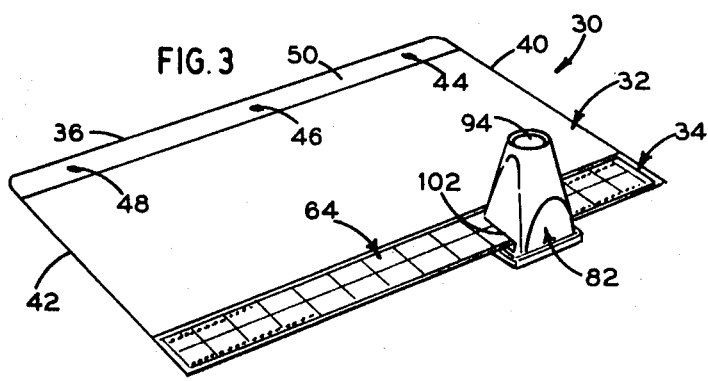
INVENTOR.
Marcel Broekman
BY
ATTORNEYS

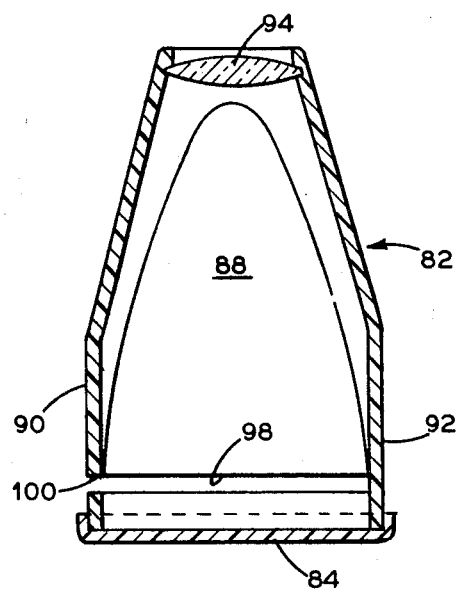
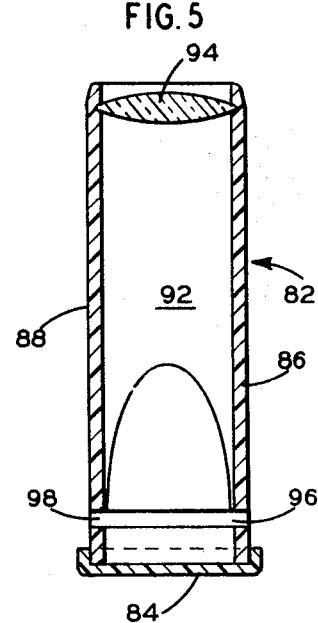
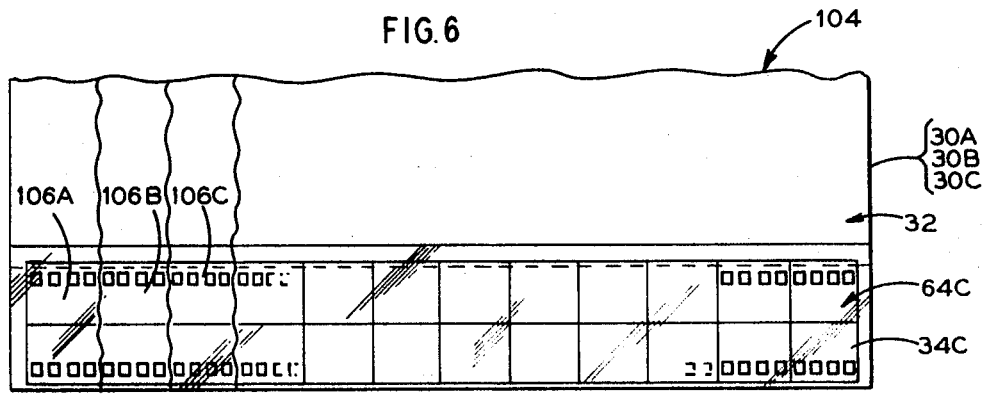
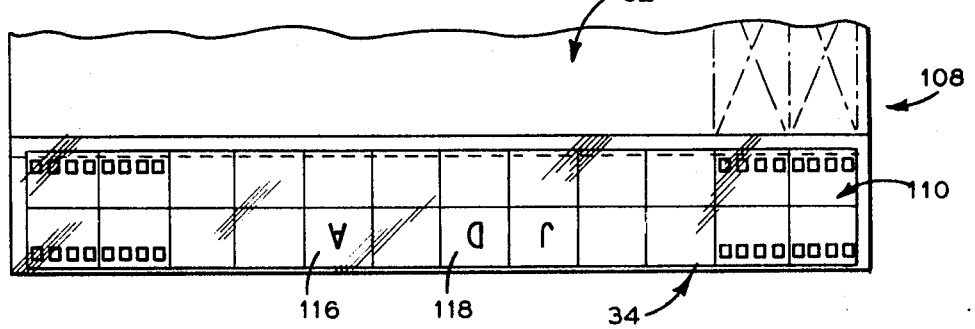

United States Patent Office 3,605,304
Patented Sept. 20, 1971

3,605,304
FILM STRIP EQUIPMENT
Marcel Broekman, Kew Gardens, N.Y., assignor to
Professional Film Services, Inc., New York, N.Y.
Filed Apr. 3, 1968, Ser. No. 718,563
Int. Cl. G09f 11/06
U.S. Cl. 40—102
8 Claims

ABSTRACT OF THE DISCLOSURE

A combination of a film strip holder and information sheet therefor including a page which is adapted to be received in a loose-leaf binder or the like. A transparent pocket is affixed to one edge of the page and it receives a film strip having a plurality of frames. Respective pieces of data relating to the individual frames are on the page and keying means is provided to correlate each one of the pieces of data to the associated frame.

The invention further includes means for viewing the strip of film.

This invention relates generally to film strip equipment and, more particularly, pertains to equipment for displaying the film strip and for imparting information relative to picture frames on the film strip.

An object of the present invention is to provide means for displaying a number of individual frames of a strip of film for viewing purposes and for simultaneously conveying information relative to each picture frame.

Another object of the present invention is to provide equipment in which the individual frames of the film strip may be easily and conveniently viewed at will, without removal therefrom.

A further object and feature of the present invention resides in the novel details of construction which provide equipment of the type described in which picture frames and information relating to the picture frames are presented so that any individual picture frame and the information relating thereto may be observed at a glance.

Accordingly, equipment constructed in accordance with the present invention includes the combination of a film strip holder for holding and displaying a strip of film having a plurality of picture frames and an information sheet therefor. The combination includes a page having a pair of longitudinal and a pair of lateral edges. Connecting means is provided on one of said pair of longitudinal edges which are cooperable with a binder for affixing the page in the binder. A transparent pocket sized to slidingly receive the strip of film therein is affixed to the other of said pair of longitudinal edges. Respective information means are provided on the page for specifying information relative to different picture frames. Keying means for correlating each one of the respective information means to the associated picture frame is also provided so that a viewer easily may obtain data relating to a viewed picture frame.

Other features and advantages of the present invention will become more apparent from a consideration of the following detailed description when taken in conjunction with the accompanying drawings, in which:

FIG. 1 is a top plan view of equipment constructed according to the present invention;

FIG. 2 is a sectional view thereof taken along the line 2—2 of FIG. 1;

FIG. 3 is a perspective view of the equipment shown in FIG. 1 illustrating its relationship to a viewing aid;

FIG. 4 is a sectional view of the viewing aid seen looking from the side;

FIG. 5 is a sectional view of the viewing aid as seen looking from the top;

FIG. 6 illustrates a top plan view of a set of pieces of film strip with parts broken away for clarity; and FIG. 7 is a top plan view of a modified embodiment, with parts broken away, of equipment constructed according to the present invention.

The equipment of the present invention is designated generally by the numeral 30 in FIG. 1 and includes a page 32 and a transparent pocket 34 attached thereto. More specifically, the page 32 includes a pair of longitudinal edges 36 and 38, and a pair of lateral edges 40 and 42. A plurality of longitudinally spaced holes 44, 46 and 48 are provided adjacent longitudinal edge 36. The holes 44–48 are adapted to receive the rings R (as shown by the dashed lines) of a conventional loose-leaf binder B (shown in FIG. 1 by the dashed lines) therethrough so that the page 32 will be retained in the binder B. A strip 50 of reinforcing plastic or the like is provided adjacent the edge 36 of the page 32 and extends forwardly beyond the holes 44–48 to reinforce this area of the page to prevent tearing or the like.

As shown more particularly in FIG. 2, the pocket 34 may be fabricated from a single strip of transparent plastic such as acetate or the like which is folded along a fold line 52 to define a lower member 54 and an upper member 56. The upper member 56 extends beyond the lower member 54 to define an end flap 58. The end flap 58 is folded along fold line 60 so that the end flap 58 is received below the member 54. An adhesive 62 is received between the end flap 58 and the page 32 to affix the pocket 34 to the page 32 adjacent the longitudinal edge 38 thereof. Hence, the pocket 34 forms a longitudinal extension of the page 32. Moreover, pocket 34 is provided with open side ends so that a film strip to be displayed easily may be inserted into or removed from the pocket 34.

More specifically, received within the pocket 34 is a film strip designated generally by the reference numeral 64. The film strip 64 includes an upper row of picture frames such as 66 and 68 and a lower row of picture frames such as 70 and 72. In practice, the film strip 64 comprises a quarter-frame 35 mm. strip of film. Each picture frame in the upper and the lower row is provided with an indicia element. To be more specific, each picture frame in the upper row is provided with a respective numeral 1–12 and each picture frame in the lower row is provided with a respective numeral 13–24. However, it is to be emphasized that a number of picture frames shown herein and the type or size of film used is for illustrative purposes only and is not to be interpreted as being a limitation of the present invention. That is, a different size film may be utilized and more or less picture frames may be provided on the film strip than is illustrated herein. Additionally, it is contemplated that color transparencies will be utilized. However, again this is for illustrative purposes only as any type of film strip may be used in practicing the present invention.

As shown in FIG. 1, the picture frames in the upper row, such as 66 and 68, and the picture frames in the lower row, such as frames 70 and 72, are oriented so that both rows of picture frames may be viewed simultaneously.

Received on the page 32, between the reinforcing strip 50 and the pocket 34 are areas such as 74, 76, 78, and 80 which contain data relative to different ones of the picture frames. The data is adapted to convey information relative to the respective picture frames. For example, if the picture frames are pictures of portraits by well known artists, the areas on the page 32 may contain such data as the name of the artist, the period during which he lived and a few remarks about the subject of the portrait. Each one of the areas such as 74–80 is provided with a keying device or an indicia means to correlate the information contained within a specific area to the associated picture. To be more specific, the data in the area 74 is preceded by the numeral 12. Thus, the information within the area 74 pertains to picture frame 12. On the other hand, the data within the area 76 is preceded by the numeral 24. This indicates to the viewer that the data within the area 76 pertains to the portrait in picture frame 24. Hence, the particular picture frame and information relating thereto are simultaneously presented to a viewer at a single glance, thereby easily and conveniently presenting to the viewer both the picture and the information relating thereto.

As shown in FIG. 1, the information relating to the various picture frames is positioned above the particular picture frame. However, this is by way of illustration only and is not to be interpreted as being a limitation of the present invention. That is, the information may be set out from the top to the bottom of the page (i.e., from edge 40 to edge 42) rather from edge 36 to edge 38.

The present invention further includes means for viewing the film strip 64. As shown in FIG. 3, a viewing aid designated generally by the reference numeral 82 is provided which is adapted to receive the pocket 34 therein and to enlarge the picture frames so that the frames may be viewed with ease. More particularly, the viewing aid 82, as shown in FIGS. 4 and 5, includes a rear wall 84, side walls 86 and 88, a top wall 90 and a bottom wall 92. A lens 94 is received adjacent the front edges of the side walls 86, 88, top wall 90 and bottom wall 92. Additionally, the rear wall 84 is comprised of a light diffusing surface which transmits light into the interior of the viewing aid 82 but which diffuses the same.

Provided in the side walls 86 and 88 are respective slots 96 and 98 which extend to the top wall 90. Additionally, a slot 100 is provided in the top wall 90 which connects the slots 96 and 98 to define a pocket-receiving groove 102 in the viewing aid 82.

In operation, the page 32 is removed from the binder B and the transparent pocket 34 is inserted into the pocket-receiving groove 102 in the viewing aid 82, as shown in FIG. 3. The viewing aid is sized so that the width of the viewing aid from side wall 86 to side wall 88 is substantially equal to the width of a picture frame on the film strip 64. Moreover, the height of the viewing aid from bottom wall 92 to top wall 90 is substantially equal to the height of the film strip 64. Accordingly, when the pocket 34 is received in the viewing aid 82, the viewing aid will bracket a pair of picture frames (i.e., a picture frame in the top row and a picture frame in the bottom row of the film strip). The lens 94 will produce an enlarged image of the particular picture frames which are being viewed so that the person viewing the frames may examine the subject matter of the frames in great detail.

Accordingly, equipment has been described for displaying a number of individual frames of a strip of film for viewing purposes and for simultaneously conveying information relative to each picture frame of the film strip.

In many applications it may be desirable to provide a set comprising a plurality of film strip equipment 30 which contain related information and related film strips. An arrangement of this type is highly desirable to provide means for quickly and easily locating a desired one of the pages 32 and the associated film strip 64. Thus, as shown in FIG. 6, a set of film strip equipment designated generally by the reference numeral 104 is provided. The set 104 includes film strip equipment 30A, 30B and 30C. Each one of the pieces of film strip equipment 30A–30C includes a respective page 32A–32C having the areas of information thereon and respective transparent pockets 34A–34C. Received in the pockets 34A–34C are respective film strips 64A–64C.

Each one of the respective film strips 64A–64C is provided with a title frame 106A, 106B and 106C. However, it is to be noted that the location of the title frames 106A–106C appear in different places on the respective film strips 64A–64C. More particularly, the title frame 106A is in the upper left-hand corner of the film strip 64A. However, the title frame 106B appears as the second frame from the left-hand edge of the film strip 64B. Additionally, the title frame 106C is located in the position of the third picture frame from the left-hand edge of the film strip 64C. It is obvious that if additional pieces of equipment 30 comprise the particular set 104, the title frame of the remaining respective film strips would accordingly be staggered one picture frame to the right for each succeeding film strip.

In operation, when it is desired to view a particular film strip in the set of equipment 104, the viewer simply quickly flips through the pieces of equipment 30A–30C until he locates the particular title frame associated with the film strip under consideration. Hence, the staggering of the title frames provides a simple and easy method for locating a particular piece of film strip equipment in a set such as set 104. Although a title frame has been disclosed for quickly locating a particular piece of film strip equipment it is obvious that any indicating device may be utilized in its place.

FIG. 7 illustrates a modified embodiment of a piece of film strip equipment constructed in accordance with the present invention. More particularly, a piece of equipment designated generally by the reference numeral 108 is provided which includes an information page 32 and a transparent pocket 34 connected thereto as in the embodiment of FIG. 1. However, received within the pocket 34 is a film strip 110 having an upper and a lower row of picture frames. The upper row of picture frames is printed in a conventional manner so that the upper row of picture frames such as picture frames 112 and 114 may be viewed in the conventional manner, as shown in FIG. 3. However, the lower row of picture frames such as picture frames 116 and 118 are inverted with respect to the upper row. Accordingly, when it is desired to view the picture frames in the bottom row, the piece of equipment 108 will be turned upside down so that the pictures in the bottom row are then oriented correctly for viewing. Thus, when the viewer observes any one particular set of picture frames in the upper and lower rows, he will not be distracted by the picture frame which he does not wish to view as this will be upside down.

Similarly, the lower row of information areas on the page 32 in the piece of film strip equipment 108 will be inverted with respect to the upper row of information areas so that the information area pertaining to a particular picture frame will be oriented correctly when the observer views the picture frame under consideration.

While preferred embodiments of the invention have been shown and described it will be obvious that numerous omissions, changes and additions may be made in such embodiments without departing from the spirit and scope of the present invention.

What is claimed is:

1. In combination, a film strip holder for holding and displaying a strip of film having a plurality of picture frames and an information sheet therefor, said combination including at least a single page having a pair of longitudinal and a pair of lateral edges, connecting means along one of said pair of longitudinal edges cooperable with a binder for affixing said pages in the binder, a transparent pocket sized to slidingly receive the strip of film therein affixed to the other of said pair of longitudinal edges, respective information means on said page for specifying information relative to different picture frames, and keying means for correlating each one of the respective information means to the associated picture frames, said pocket comprising a first member having an end flap, a second member underlying said first member, and adhesive means for attaching said end flap to said page.

2. The combination of claim 1, in which said connecting means comprises a plurality of longitudinal spaced holes sized and positioned to receive the holding rings of a loose-leaf binder therein, and reinforcing means along said one longitudinal edge for preventing tearing of said holes.

3. In combination, a film strip holder and information sheet, said combination comprising a page having a pair of longitudinal and a pair of lateral edges, connecting means adjacent one of said pair of longitudinal edges cooperable with a binder for affixing said page in the binder, a film strip having a plurality of picture frames, a transparent pocket affixed to the other of said pair of longitudinal edges receiving said film strip therein, said transparent pocket being sized and positioned so that said film strip is enclosed within said transparent pocket and said film strip extends beyond said other of said pair of longitudinal edges, respective information means on said page for specifying information relative to different ones of said picture frames, and keying means for correlating each one of the respective information means to the associated one of the picture frames.

4. The combination of claim 3, in which said film strip includes at least a first row of picture frames and a second row of picture frames.

5. The combination of claim 4, in which said second row of picture frames is inverted with respect to said first row of picture frames.

6. The combination of claim 3, in which said keying means includes a different indicia element for each one of said respective information means, and the identical one of said indicia elements on the associated one of said picture frames.

7. The combination of claim 3, including a plurality of pages having a pair of longitudinal and a pair of lateral edges, a respective transparent pocket attached to the longitudinal edge of each of said pages, a film strip in each of said pockets, each film strip having a plurality of picture frames, at least one frame of each of said film strips being a title frame, the title frames of at least preselected ones of said film strips having different locations than the title frames of others of said film strips.

8. The combination of claim 7, in which each film strip comprises a 35 mm. quarter-frame film strip.

References Cited

UNITED STATES PATENTS

| | | | |
|---|---|---|---|
| 1,987,377 | 1/1935 | Stiles | 40—159 |
| 2,859,548 | 11/1958 | Pruner | 40—63A |
| 2,862,323 | 12/1958 | Mascolo | 40—159 |
| 2,889,647 | 6/1959 | Roman | 40—159 |

FOREIGN PATENTS

| | | |
|---|---|---|
| 785,174 | 5/1968 | Canada. |
| 910,106 | 1/1946 | France. |

ROBERT W. MICHELL, Primary Examiner

W. J. CONTRERAS, Assistant Examiner

U.S. Cl. X.R.

40—106.1, 158B